United States Patent
Schuetz et al.

(10) Patent No.: US 7,266,953 B2
(45) Date of Patent: Sep. 11, 2007

(54) STACKED CONDENSING ASSEMBLY

(75) Inventors: Reinhard Schuetz, Calgary (CA); Wayne Bowd, Blackfalds (CA)

(73) Assignee: TankSafe Inc., Calgary (CA)

( * ) Notice: Subject to any disclaimer, the term of this patent is extended or adjusted under 35 U.S.C. 154(b) by 187 days.

(21) Appl. No.: 11/074,772

(22) Filed: Mar. 9, 2005

(65) Prior Publication Data
US 2005/0198975 A1    Sep. 15, 2005

(30) Foreign Application Priority Data
Mar. 10, 2004   (CA) .................................. 2460543

(51) Int. Cl.
*F25D 17/06* (2006.01)
(52) U.S. Cl. .............................. 62/93; 62/288; 62/289; 261/153
(58) Field of Classification Search ............ 62/85, 62/93, 285, 272, 288, 291, 171, 92, 289; 137/312; 161/150, 153; 261/150, 153
See application file for complete search history.

(56) References Cited

U.S. PATENT DOCUMENTS

| | | | | |
|---|---|---|---|---|
| 3,367,120 A | * | 2/1968 | Franklin | 62/3.2 |
| 3,463,216 A | * | 8/1969 | Miles | 159/47.3 |
| 3,788,096 A | * | 1/1974 | Brilloit | 62/55.5 |
| 4,148,617 A | * | 4/1979 | Clark | 55/529 |
| 4,193,443 A | * | 3/1980 | Nanaumi et al. | 165/66 |
| 5,031,411 A | * | 7/1991 | Gehring et al. | 62/93 |
| 5,107,919 A | * | 4/1992 | Basseen et al. | 165/47 |
| 5,119,640 A | * | 6/1992 | Conrad | 62/272 |
| 5,255,735 A | * | 10/1993 | Raghava et al. | 165/111 |
| 5,261,254 A | * | 11/1993 | Cattane | 62/271 |
| 5,400,607 A | * | 3/1995 | Cayce | 62/90 |
| 5,799,728 A | * | 9/1998 | Blume | 165/231 |
| 6,516,754 B2 | * | 2/2003 | Chadwick | 122/19.1 |
| 7,089,997 B2 | * | 8/2006 | Weng et al. | 165/60 |

FOREIGN PATENT DOCUMENTS

JP    2001-205036 A   *   7/2001

* cited by examiner

Primary Examiner—Mohammad M. Ali
(74) Attorney, Agent, or Firm—Thomas E. Malyszko

(57) ABSTRACT

A condensing assembly for urging condensation of a vapour into a liquid has a vertically stacked modular array of horizontal condensation units exposed to a heat transfer medium. Each condensation unit has a cooling chamber, a plurality of hollow legs and necks accessing the cooling chamber to define a fluid passageway. An open or enclosed space between vertically opposed condensation units is created by coupling the necks and legs of opposed condensation units. Introduced vapour travels along the fluid passageways and through the cooling chambers for condensation into liquid, which then travels along the fluid passageways to a storage tank. A cooling loop in each cooling chamber increases condensation. Vapour funnels in the condensation units along the fluid passageway reduce vapour to liquid contact therealong. An inlet header provides additional cooling to the vapour prior to entering the condensation units.

32 Claims, 4 Drawing Sheets

STACKED CONDENSING ASSEMBLY

FIELD OF THE INVENTION

The present invention relates to a condensing assembly having an array of one or more condensation units for condensing vapours generally associated with the petroleum industry and other service sectors.

BACKGROUND OF THE INVENTION

Many industrial and commercial processes create vapourized liquids, particularly hot vapours, which must be condensed into a cooler liquid form for storage and eventual disposal or treatment. In the petroleum industry, for instance, a glycol/water vapour mixture is created at dehydration ("dehy") facilities. However, substantial amounts of such vapour should not be released into the atmosphere to avoid undue pollution of the environment. There are several accepted methods of dealing with the glycol/water vapour, such as running the hot vapour through a series of overhead or underground pipes to cool and condense the vapour into liquid form, and then to pass the liquid into an underground storage tank. Such piping is problematic and undesireable, and the underground storage tanks suffer from several deficiencies as noted in applicant's Canadian Patent 2,196,941 and U.S. Pat. No. 5,971,009.

One solution to the above-noted problems has been to provide a dual containment condensation assembly, as set out in Canadian Patent 2,274,251 and U.S. Pat. No. 6,381,979, and another solution has been to provide a novel stand-alone condensation tank which may be connected remotely to an existing storage tank, or alternately may be retro-fitted thereonto, as described in applicant's Canadian Patent Application 2,450,979.

However, it is desirable to further provide a condensation unit of a more compact design, but which has a relatively greater cooling surface area per unit volume to promote an increased rate of condensation. The novel design should be modular in nature so that a desired number of horizontally oriented condensation units may be stacked in a vertical array to suit a user's present or future requirements and to provide a desired rate of condensation. Such condensation units should have the same or substantially similar configurations to allow for convenient formation of the stacked array, and to allow for units to be built relatively quickly and efficiently in an assembly-line format. The stacked arrangement should provide for openings between the condensation units to provide a more uniform cooling effect across the multiple units, along both their top and bottom surfaces. The novel open modular design should further reduce wind loads on the resultant structure, as less vertical surface area is needed to provide the same cooling as in a prior art single tank design.

In another version, the condensation units may be provided with a novel internal vapour funnel arrangement which should facilitate upward vapour flow through the stacked array and reduce contact with downflowing liquid.

In yet another version, a novel inlet header may be provided to expose incoming vapour to a cooling surface prior to its introduction into the condensation units.

In yet a further version, an artificially induced heat transfer medium may be introduced internally or externally to the cooling chambers to substantially increase cooling effectiveness and the rate of vapour condensation in the condensation units.

SUMMARY OF THE PRESENT INVENTION

Hence, in one aspect the invention provides an apparatus for urging condensation of a vapour comprising:
 a shell forming an enclosed chamber and having an outer surface adapted to be exposed to a heat transfer medium;
 at least one hollow leg member accessing said chamber through a first side of said shell for fluid communication with said chamber;
 at least one hollow neck member accessing said chamber through a second side of said shell for fluid communication with said chamber, said neck and leg members defining a first fluid passageway;
 a second fluid passageway defined by said chamber;
 wherein fluid condensed in said second fluid passageway is transmitted toward a fluid storage means along said first fluid passageway.

In another aspect the invention provides an apparatus for urging condensation of a vapour comprising:
 opposed, generally planar first and second plate members, and a sidewall extending between peripheral edges of said plate members to define an internal cooling chamber, and wherein external surfaces of said plate members and sidewall are exposed to a heat transfer medium;
 at least one hollow leg member accessing said cooling chamber through said second plate member for fluid communication with said cooling chamber;
 at least one hollow neck member accessing said cooling chamber through said first plate member for fluid communication with said cooling chamber, said neck member being axially aligned with said leg member to define a first fluid passageway;
 a second fluid passageway defined by said cooling chamber;
 wherein fluid condensed in said second fluid passageway is transmitted toward a fluid storage means along said first fluid passageway.

In yet another aspect the invention provides an assembly for urging condensation of a vapour into a liquid comprising:
 a vertically stacked array of horizontally oriented condensation units exposed to a heat transfer medium;
 each condensation unit having:
  a cooling chamber defined by opposed and complimentary shaped ceiling and floor plate members and a sidewall extending between peripheral edges of said plate members;
  a plurality of elongate hollow leg members accessing said cooling chamber through said floor plate member for fluid communication with said cooling chamber;
  a plurality of elongate hollow neck members accessing said cooling chamber through said ceiling plate member for fluid communication with said cooling chamber, each neck member being axially aligned with a respective one of said leg member to define a first fluid passageway therethrough;
  said cooling chamber defining a second fluid passageway generally transverse to said first fluid passageway;
 a space for receiving said heat transfer medium between opposed condensation units, wherein said space is created by coupling the neck and leg members of said opposed condensation units;
 at least one of said leg members of the lowermost condensation unit in said array being operatively engaged with a respective inlet to a fluid storage means;
 an inlet at one of said condensation units for introducing said vapour into said array;

wherein said introduced vapour travels between the condensation units along said first fluid passageways to said second fluid passageways which serve to urge condensation of said vapour to said liquid, and wherein said liquid is urged to travel along said first fluid passageways to said fluid storage means.

In a further aspect, the heat transfer medium may be the ambient, or a fluid for cooling (or alternately for heating, if need be) the chamber(s) of the condensation unit.

BRIEF DESCRIPTION OF THE DRAWING FIGURES

Embodiments of the invention will now be described, by way of example only, with reference to the accompanying drawings, wherein.

DESCRIPTION OF EMBODIMENTS

Figure 1:
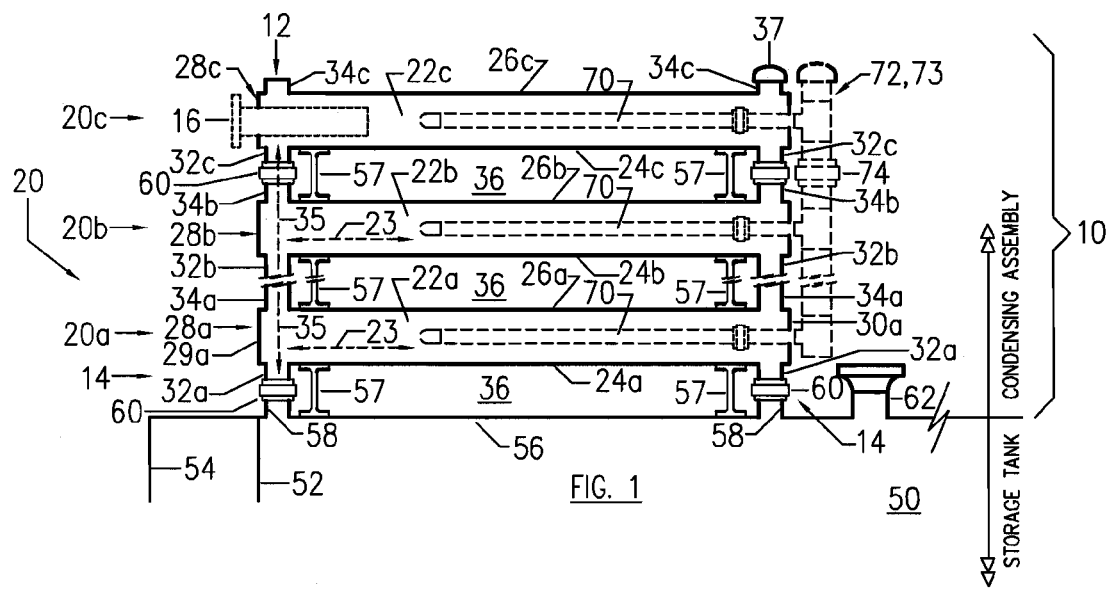
FIG. 1 is a transparent elevational view of a condensing assembly according to a first embodiment of the present invention showing a stacked array, or arrangement, of condensation units mounted atop a storage tank, a top entry vapour inlet, an optional cooling loop header and optional internal cooling coils.
Figure 2:
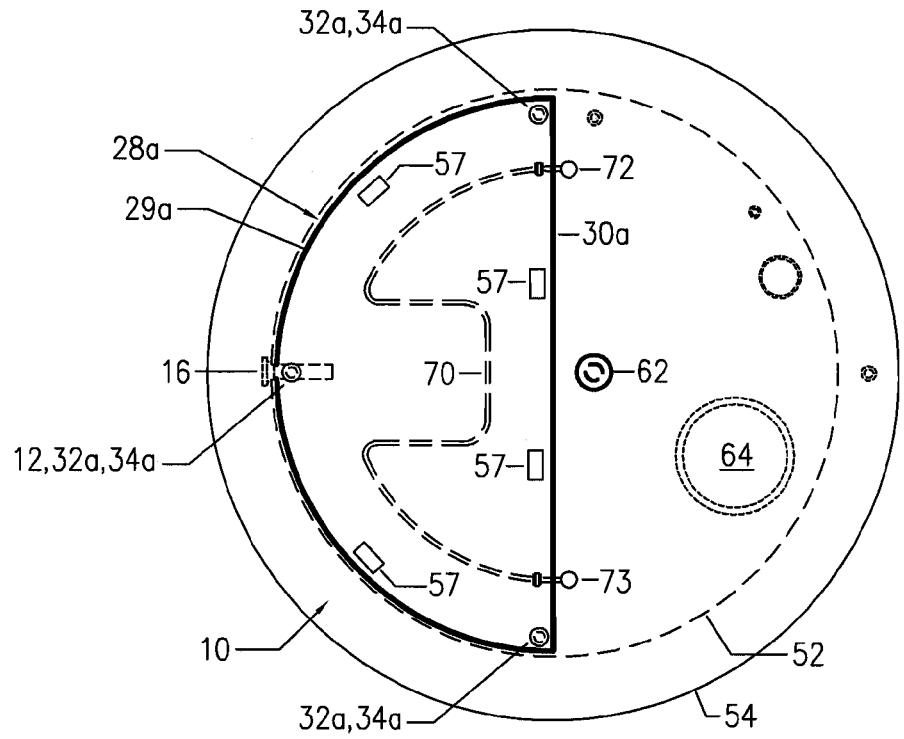
FIG. 2 is a transparent plan view of FIG. 1.

A condensing assembly according to a first preferred embodiment of the present invention is indicated by reference numeral 10 in FIGS. 1 & 2. In general, the assembly is configured to receive a fluid at one or more vapour inlets 12 and to urge the fluid to separate into gas and liquid components, the liquid component being deposited by gravity through one or more liquid outlets 14 and stored in a storage tank 50 for future disposal or treatment as required. The storage tank may be of the type having a primary fluid holding tank portion 52 and a secondary containment tank portion 54 as shown and described in Canadian Patent 2,196,941 or U.S. Pat. No. 5,971,009 for a "Dual Containment Assembly". For illustrative purposes, the fluid in this instance will be a vaporized liquid normally encountered in the petroleum industry, such as discharge from a dehydration unit at a wellsite facility.

The present condensing assembly is designed such that the storage tank may be situated remotely with a pipe or like means therebetween for liquid communication, by gravity or with the aid of a pump or like mechanical means, between the assembly's liquid outlet(s) 14 and the corresponding inlet(s) 58 of the storage tank. Alternately, the condensing assembly may be placed adjacent to the storage tank, and preferably atop the storage tank roof 56 with the aid of strategically placed supports 57 or other suitable structural arrangement placed on or about the storage tank. In such case the outlets 14 may be joined directly to the primary storage tank's inlets 58, using chamber connections 60 or other suitable means, for direct liquid transfer. The condensing assembly's outlets 14 also serve another purpose in this preferred configuration, namely that of receiving any vapour rising from the primary storage tank's inlets 54 for condensing into liquid in the condensation units.

The condensing assembly 10 is formed of at least one condensation unit. Depending on the volume of vapour to be condensed, ambient conditions and other factors, several horizontally extending, or oriented, condensation units (collectively identified by reference numeral 20) may be stacked in an interconnected modular array to provide a desired condensation capacity. For illustrative purposes, three vertically stacked condensation units are shown in FIG. 1 wherein a lowermost, or bottom, unit (identified by 20a) is supported atop the storage tank, a middle, or intermediate, unit 20b sits atop the bottom unit 20a, and an uppermost, or top, unit 20c of the array sits atop the middle unit 20b. Similar reference numerals will be used for the same or substantially similar components of the various condensation units in a stacked array.

As the condensation units share many of the same features, one of the condensation units, namely the bottom unit 20a, is chosen to describe these and other features in detail. The shell of the bottom condensation unit 20a forms a hollow interior defining a vapour cooling chamber 22a closed to the ambient. The shell is defined by a first generally planer floor plate 24a, an opposed second generally planar ceiling plate 26a spaced above the floor plate, and a third generally planar sidewall 28a extending transversely between the peripheral edges of the floor and ceiling plates. The floor and ceiling plates are of complimentary, semicircular shape, and so the sidewall 28a has a first circumferential portion 29a and a second radially extending portion 30a. The resulting half-moon profile of the condensation unit 20a in plan view (as viewed in FIG. 2) is preferred as the circumferential portion 29a of the sidewall closely mirrors the profile of the storage tank below, and the radial portion 30a of the unit does not extend over and obstruct roof-top features of the storage tank, such as the vent 62 and the manway 64. It will be appreciated that the condensation unit may take numerous other profiles, but such variants may have certain disadvantages and inefficiencies over the half-moon profile. For instance, where the circumferential portion 29a is substituted by a square or box shape profile, the resulting corners may adversely affect drainage of liquids in the cooling chamber and lead to unwanted pooling on the floor plate, the corners may extend beyond the perimeter of the storage tank and be prone to impact or damage by maintenance vehicles, more supports 57 may be needed, and more material and fabrication time will likely be required.

The condensation unit 20a has at least one, but preferably a plurality, of elongate hollow legs 32a at spaced intervals along its perimeter which extend transversely and outwardly from the floor plate 24a (i.e. away from the cooling chamber 22a). Associated with each leg in opposed longitudinal, or axial, alignment is an elongate hollow neck 34a extending transveresely and outwardly from the ceiling plate 26a. Both the legs and necks are open-ended, and access, or open into, the cooling chamber. In the first embodiment, the legs and necks are tubular to facilitate coupling (as described later), and are perpendicular to their respective plates 24a, 26a so that each opposed pair of legs and necks is axially aligned, thus forming and defining a first, or vertical, fluid passage (indicated by the dashed line 35 in FIG. 1) for fluid communication into and out of the cooling chambers, each of which forms a second, or horizontal, fluid passage 23. In this embodiment three pairs of legs and necks are provided for each condensation unit: one near each corner where the circumferential and radial portions 29a, 30a of the sidewall join; and another about mid-way along the circumferential portion 29a. As few as one leg and neck may be used for each condensation unit, although this would alter flow efficiency and cooling of the fluids therein, depending on the unit's profile.

The legs and necks function to join multiple condensation units to form the earlier noted stacked array, and to join the array to the storage tank, both structurally and for fluid communication. In the FIG. 1 embodiment, the legs 32a of the lowermost condensation unit 22a axially align with respective inlets 58 protruding above the storage tank roof 56, and are adapted to be joined with coupling members 60 in a fluid tight manner. Likewise, the necks 34a are adapted to be joined via such coupling members to respective axially aligned legs 32b of the neighbouring condensation unit 20b above, thereby extending the vertical fluid passages 35 between the chambers 22a and 22b in the stacked array. The fluid passages 35 are further extended to the uppermost condensation unit 22c when it is joined to unit 22b, although the necks 34c are either capped, as at 37, or function as a vapour inlet, as at 12. In this embodiment only one inlet 12 is used, and the other two necks are capped. Although the coupled legs and necks are capable of supporting some or all of the condensation units above, it is preferred to supplement the array with further load bearing supports, such as the vertically aligned supports 57, to transfer load to the tank roof and distribute it over a larger area.

The elongated legs and necks perform yet another function, namely to vertically space apart the condensation units and create air spaces 36 therebetween. This open stacked structure exposes the floor 24a, 24b, 24c and ceiling plate 26a, 26b, 26c to a heat transfer medium, in this case ambient air flow, thus providing substantially more cooling surface than if such spaces 36 were omitted.

It can now be appreciated how the array of three stacked condensation units 20a, 20b and 20c of the first embodiment functions. Vapour is introduced into the condensing assembly through one of the necks 34c to define the vapour inlet 12. The remaining necks are capped, although they may also be used as vapour inlets if need be. As the vapour travels through the top chamber 22c, some of the vapour will condense into a liquid phase along the floor and ceiling plates 24c, 26c and be channeled toward one of the legs 32c, where it should travel by gravity along the vertical fluid passage 35 (formed by the vertically aligned necks/legs) and through inlet 58 into the primary storage tank 52. As the remaining (uncondensed) vapour fills the top chamber, the vapour should migrate along the first fluid passages (i.e. down through the legs 32c and necks 34b) into the next horizontal fluid passage 23 formed by the middle chamber 22b for further condensation. Likewise, should sufficient vapour be pumped into the assembly through vapour inlet 12, the vapour may be urged to travel from the middle condensation unit 20b to the bottom condensation unit 20a for yet further condensation. However, as vapour tends to rise, vapour may also travel from the middle chamber to the top chamber should the vapour pressure drop in the top chamber to allow such return. Also, the present arrangement allows for any vapour in the storage tank to travel up through the inlets 58 into the condensing assembly for condensation into liquid, which will then return into the storage tank.

The condensing assembly of the first embodiment may optionally employ further features to enhance or alter performance. First, the inside and/or outside surfaces of the ceiling plate, and in some cases the floor plate, may take different forms, depending on the fluids to be encountered and heat transfer conditions. In some cases, a smooth, flat surface may not suffice, and so the surface may be bubbled or corrugated to promote condensation. Also, some or all of the floor plate may be flat or high-centered and sloped toward the legs 32, to channel or otherwise control drainage of liquid from the cooling chamber.

Secondly, the vertical vapour inlet 12, defined by neck 34c, may be capped and replaced by a horizontally oriented inlet pipe 16 which enters the top unit's sidewall and extends past the leg/neck 32c, 34c into the top cooling chamber 22c. This variant is particularly suitable for a vapour source that introduces vapour into the assembly under significant pressure and/or velocity. Whereas the vertical vapour inlet 12 may have undesireably directed such rapid vapour past the top cooling chamber and into one of the lower chambers, the horizontal inlet 16 ensures that the incoming vapour does not bypass the top cooling chamber 22c before it can migrate downwardly through the array.

Thirdly, the rate of condensation may be enhanced by introducing a further heat transfer medium either internally or externally to one or more of the chambers. This may be particularly suitable for warmer climates, or where excessively hot incoming vapours are expected. In the first embodiment, one or more continuous cooling coils, or loops, 70 are placed inside each cooling chamber. A refrigerant or other suitable coolant is introduced into each cooling coil from outside the condensation assembly 10 through an inlet cooling loop header 72, and exits through an outlet header 73. The vertically oriented headers 72/73 are of modular design, joined by couplers 74 similar in function to couplers 60, to accommodate any number of stacked condensation units. Alternately, it will be appreciated that a heated fluid may be circulated through the coils in particularly cold climates where freezing of the condensed vapour in the condensing assembly may be an issue.

Figure 7:
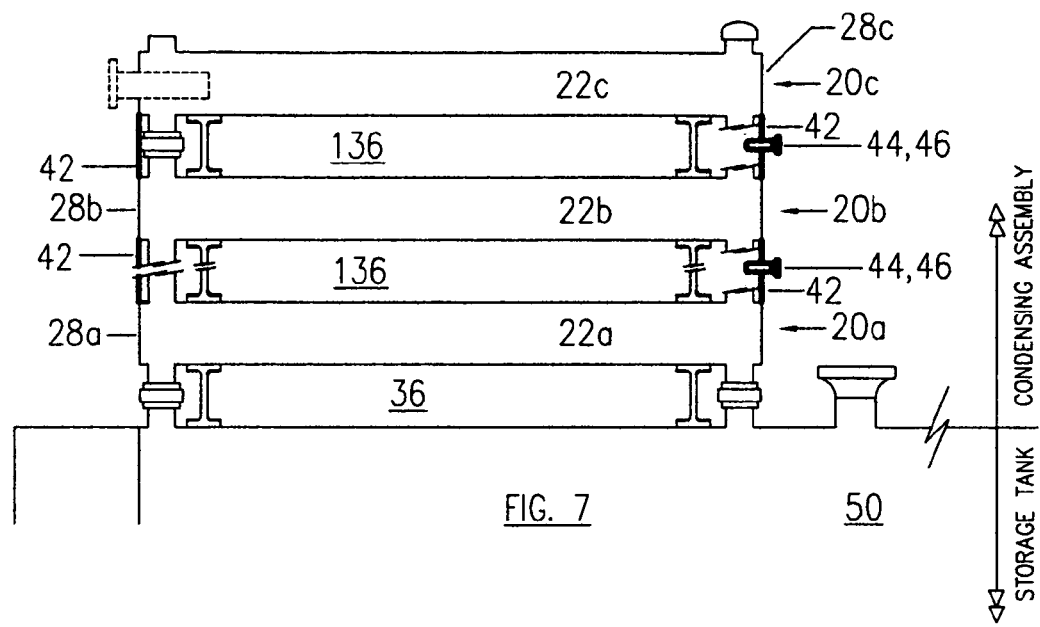
FIG. 7 is a view similar to FIG. 1 without the cooling loop header, but showing an enclosed interstitial space between condensation units; and, FIG. 8 is a transparent plan view of FIG. 7.
Figure 8:
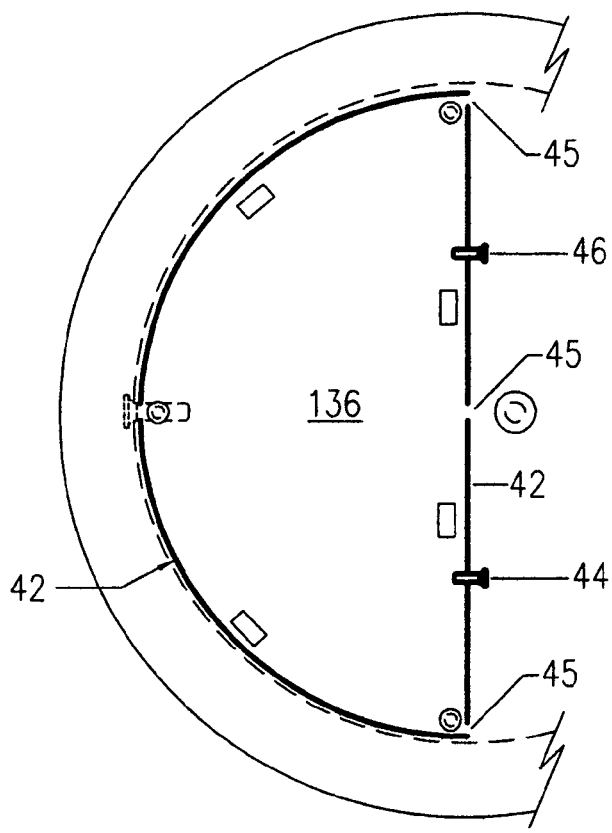

In a variant of the first embodiment shown in FIGS. 7 and 8, the two upper interstitial spaces 136 between the condensation units 20a-c are enclosed by peripheral plates, or jackets 42, which generally follow the profiles of the condensation units 20a-c and extend transversely between adjacent sidewalls 28. A heat transfer medium, such as artificially cooled air, may be pumped into the enclosed spaces 136 through one or more inlets 44 to enhance cooling of the chambers 20a-c. Such air may be cooled by conventional refrigeration, or by like means such as one or more vortex tubes. The introduced air exits each interstitial space 136 at one or more openings 45 which also act as drains for any condensation. Alternately, cooled air can be introduced through some of the openings 45, and the inlet 44 can be used for connection to a cooling coil (70 as in FIG. 2) with an outlet at 46. If need be, it will be appreciated that a heated fluid, most commonly air, may be introduced into the spaces 136 for effecting heating rather than cooling. Again, vortex tubes may be used for such heating effect.

Figure 3:
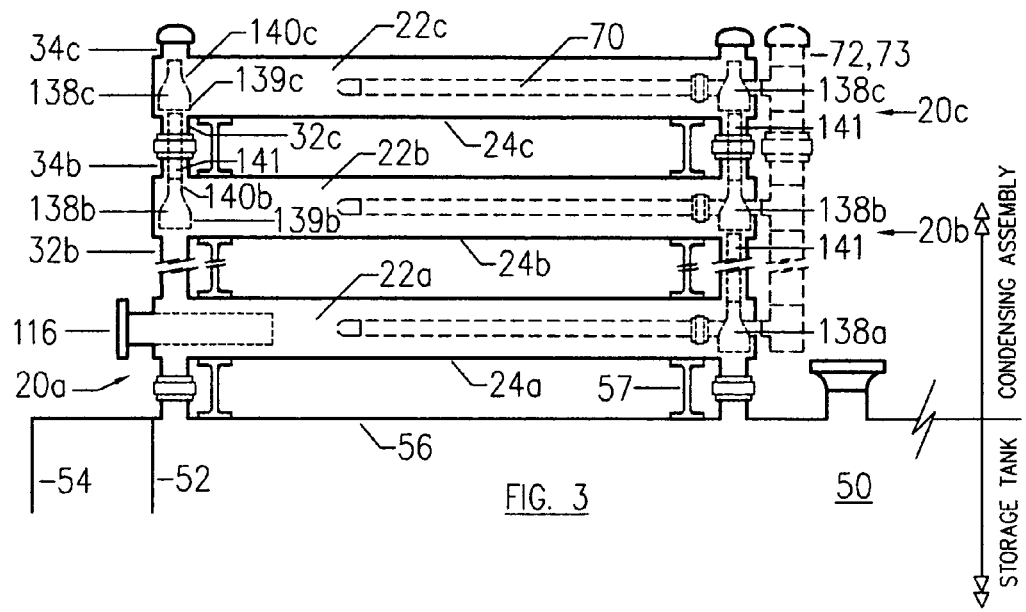
FIG. 3 is a view similar to FIG. 1 showing a condensing assembly according to a second embodiment with a bottom entry vapour inlet and optional vapour funnels within the condensation units.
Figure 4:
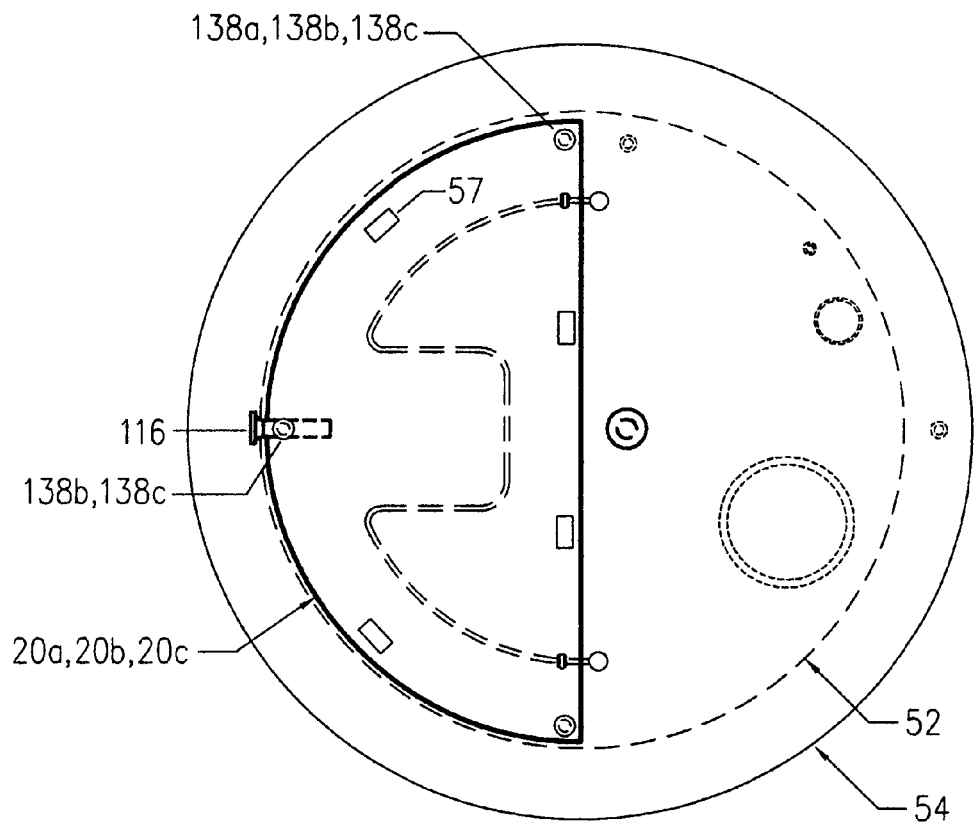
FIG. 4 is a transparent plan view of FIG. 3.

FIGS. 3 and 4 disclose a second embodiment of the invention. For each of the various embodiments, the same reference numerals are used for the same or substantially similar components. FIG. 3 shows a horizontal vapour inlet 116 substantially the same as the earlier vapour inlet 16, except that the former enters the sidewall of the bottom unit 20a and extends past the leg/neck 32a, 34a into the bottom chamber 22a. In this variant, the introduced vapour in the bottom chamber is allowed to migrate toward the capped top unit 20c which lacks any vapour inlet. In some applications a bottom mounted inlet 116 should have the following advantages:

a faster distribution of vapours into the cooling chambers, as heated vapour rises;

no need to adjust the inlet's location if more condensation units are added to the top of the assembly; and, a lower and more convenient tie-in for a gravity fed fluid source.

The second embodiment further employs hollow, open-ended, inverted funnel-like members, or vapour funnels within the vertical fluid passages formed by the stacked arrays of legs and necks. The vertically aligned funnels 138b and 138c of FIGS. 3 and 4 are discussed herein for ease of illustration. The funnel 138b (as is each funnel in the assembly) is mounted within the cooling chamber 22b in vertical alignment with the corresponding leg 32b and neck 34b, but the funnel's broader lower end 139b is elevated above the leg 32b and floor plate 24b to avoid interfering with fluid drainage from the cooling chamber into the hollow leg 32b. The funnel's narrower opposed upper end 140b sits either in or just below the neck 34b, and should be narrower than the neck's opening to avoid obstructing fluid flow down the neck 34b into the chamber 22b. The end 140b preferably does not protrude from the neck 34b to avoid damage. An elongated, hollow, open-ended funnel extension 141 is mountable to the funnel's upper end 140b and terminates at its opposed open end just below the broad end 138c of the funnel 138c in the next chamber 22c above. The extension should be narrower than the openings of the respective coupled leg 32c and neck 34b to avoid obstructing fluid flow down the neck and leg.

In use, the funnel arrangement of the second embodiment allows for vapour from the storage tank or a lower chamber to be channeled to the uppermost cooling chamber through the vertical fluid passage with little or no mixing with fluid descending the same vertical fluid passage. To illustrate, most or all of the rising vapor exiting the leg 32b is captured by the funnel 138b and is channeled up through the extension 141 to the next higher funnel 138c. Hence, the vapour rises through the centre of the vertical fluid passage without mixing with fluid descending along the outer perimeter of the fluid passage. As the funnel 138c is uppermost in the described funnel arrangement, the channeled vapour exits the upper end 140c of the funnel and enters the uppermost cooling chamber 22c to proceed with condensation.

Although the funnel extension may be made integral with each funnel, it is preferred that the extension remain as a separate component. As a result, no part of any funnel protrudes from its respective condensation unit to avoid damage thereto during fabrication and handling, and the extension does not interfere with the modular construction of the condensing assembly (namely, the extension need not be sawed off the funnels 138c of the uppermost condensation unit to allow capping of its necks). Consequently, during assembly of the condensation units, the extensions 141 are merely mounted, as by screwing, onto the upper ends 140 of the funnels of one condensation unit before the next condensation unit is stacked and secured thereto. Furthermore, if the vapour inlet 116 into a stacked assembly is located such that it intersects a vertical fluid corridor, as shown in FIGS. 3 and 4, then a funnel is omitted at that location. Alternately, the vapour inlet location may be shifted so as to allow for a funnel at that location.

Figure 5:
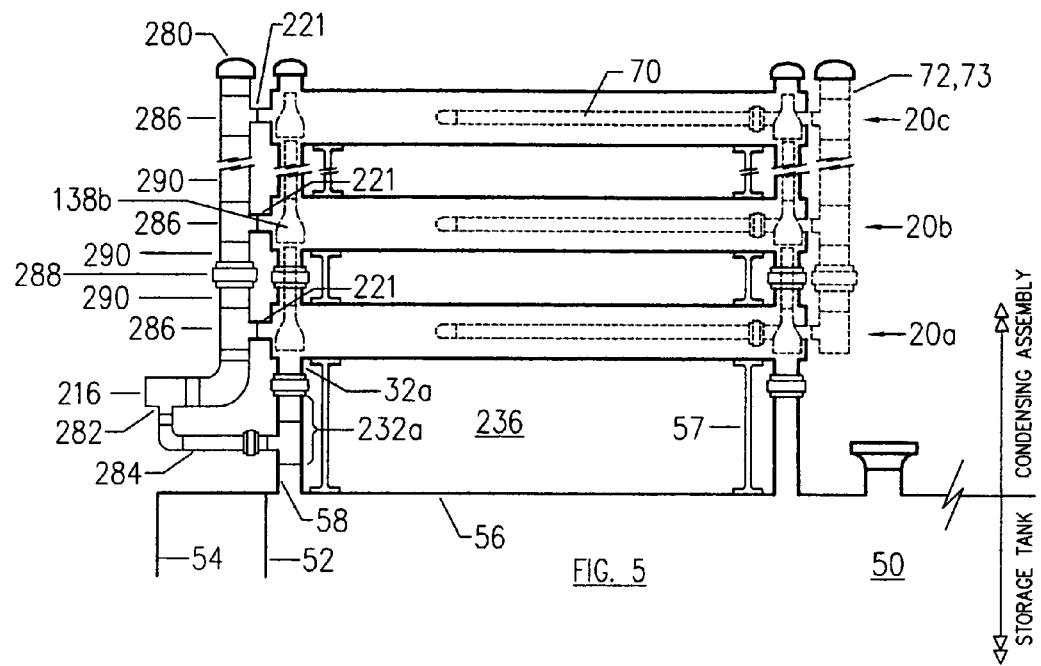
FIG. 5 is a view similar to FIG. 3 showing a condensing assembly according to a third embodiment with an optional vapour inlet header to each condensation unit.
Figure 6:
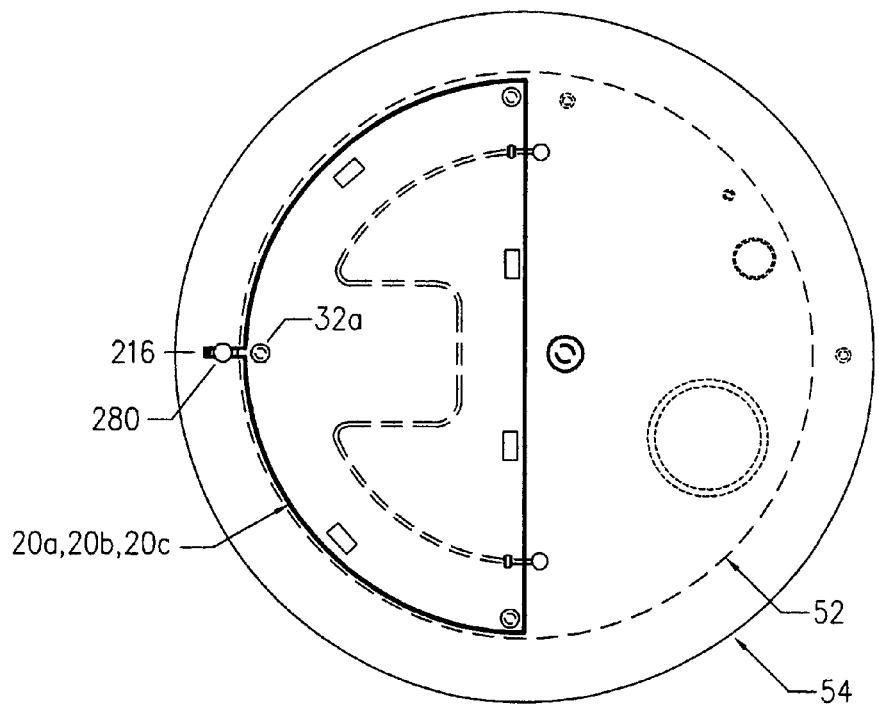
FIG. 6 is a transparent plan view of FIG. 5.

The third embodiment of the present invention further employs a vapour inlet header 280 for providing additional cooling of incoming vapour from inlet 216 prior to entry into the condensation units, as shown in FIGS. 5 and 6. The inlet header 280 is located outside the condensation units and has a vertically stacked segmental design to complement the modular design of the condensing assembly. Specifically, the inlet header has a first T-joint 282 which accepts the vapour inlet 216 and allows the vapour to pass into a vertical portion of the header 280 which communicates with the condensation units. The stem of the T-joint 282 connects to a drain line 284 for draining any condensed liquid from the inlet header 280 to the storage tank. The drain line may be connected to an extension leg 232a which joins the leg 32a with the inlet 58 of the primary storage tank. This arrangement provides a higher space 236 than in the earlier embodiments, and as a result the extension leg 232a itself promotes condensation, particularly of any vapour rising from the tank inlet 58.

The vertical portion of the inlet header has a second T-joint 286 for every condensation unit in the condensing assembly. The stem of each second T-joint 286 is connected to a dedicated vapour inlet 221 in a respective condensation unit. The second T-joints 286 are connected in vertical alignment by a plurality of header connections 288 and extension segments 290, as needed.

In use, some of the vapour from the vapour inlet 216 should condense as it travels through the various segments 282, 286, 288 and 290 which make up the inlet header 280, as it is cooled by the ambient or other heat transfer medium. The condensed liquid should drop to the bottom of the inlet header and drain through line 284 to the storage tank. The remaining uncondensed vapour should then continue travelling through the inlets 221 into the respective condensation units for further condensation. It will be appreciated that the inlet header 280 may be used in a condensing assembly with or without the optional cooling coils 70, the vapour funnel arrangement 138 and the jacket enclosed spaces 136, as desired.

Some of the many advantages of the present invention should now be apparent.

The condensing assembly of this invention provides a much greater cooling surface area for promoting condensation than prior art condensation tank designs. Specifically, the ratio of cooling surface area per unit of cooling chamber volume is particularly advantageous in the current design. To illustrate, if the three condensation units in FIG. 1 were collapsed to omit the spaces 36 so as to provide a ground-level tank with a single open interior of equal volume as the three condensation units, then the available exterior cooling surface of such single tank would be roughly equivalent to the combined areas of only the ceiling plate 26c and the sidewalls 28a, 28b and 28c of the condensation units. The single tank would omit no less than the cooling surfaces provided by the floor plates 24a, 24b, 24c and the ceiling plates 26a, 26b of the first embodiment. Even the numerous legs and necks between the cooling chambers add to the cooling effect of this embodiment. Such additional cooling surface area exposed to the ambient, or other heat transfer medium, in the present design should provide a significantly greater rate of condensation than the single tank version.

The open stacked arrangement of the present design should provide a more uniform cooling effect across the multiple chambers than would be experienced in the above-noted single tank design, particularly because each cooling chamber is relatively slender and is cooled from both top and bottom surfaces (i.e. the ceiling and floor plates).

The modular design to the present condensing assembly allows for convenient size modifications. Since the condensation units have the same or substantially similar designs, numerous units can be built relatively quickly and efficiently in an assembly-line format. A desired number of units, whether one, two, three or more, may then be stacked in a vertical array as described earlier to suit a customer's requirements and to provide a desired rate/volume of condensation. Advantageously, further condensation units may be readily added or removed later should the customer's requirements change, or should other factors require an increase or decrease in condensation.

The present open modular design should also reduce wind loads on the resultant structure, as less vertical surface area is needed to provide the same cooling as in a single tank design (as noted earlier).

A separate cooling loop 70 in each cooling chamber increases vapour condensing efficiency overall, as compared to prior art condensing tanks with such loops. Taking the single tank of equivalent volume noted earlier, such tank would most likely have one cooling loop located adjacent to the roof. Further loops lower down in the tank would typically not be provided nor desired, as greatest efficiency is achieved near the top of the tank where the vapour migrates and concentrates. In contrast, the present design of FIG. 1 provides the equivalent of three "roofs", namely ceiling plates 24a, 24b, 24c, under each of which a cooling coil may be placed for maximum effect.

In the second embodiment the vapour funnel arrangement should facilitate upward vapour flow through the vertical fluid columns and reduce contact with downflowing liquid. Hence, revapourization of the downflowing liquid should be decreased by reducing heat exchange with the oppositely moving vapour.

In the third embodiment a further advantage is had with the inlet header 280 which provides added cooling surface area to incoming vapour prior to its introduction into the condensation units.

In all of the embodiments, the three vertical fluid passages 35 through each array provide a redundancy, or safety factor, regarding fluid transfer from the inlet 12 through to the storage tank. It will be appreciated that an array with only one vertical fluid passage, for instance one set of vertically aligned legs/necks joining the condensation units of the stacked array, may suffice for fluid transfer therethrough, particularly if adequate load support is provided for the array, as with appropriately placed supports 57. However, the described embodiments are preferred since the three sets of vertically aligned legs/necks not only effectively provide structural stability and load transfer to the array, but enhance fluid communication therethrough. Further, should one of the legs or necks become blocked or obstructed, then the array would not cease to function as fluids can continue to travel through the other fluid passages.

Also, in all of the embodiments, the jacket enclosing the interstitial spaces between the condensation units should provide a substantially enhanced heat transfer (most typically cooling) efficiency through the introduction of a temperature altered medium, such as artificially cooled air.

The above description is intended in an illustrative rather than a restrictive sense and variations to the specific configurations described may be apparent to skilled persons in adapting the present invention to specific applications. Such variations are intended to form part of the present invention insofar as they are within the spirit and scope of the claims below. For instance, it will be appreciated that the legs and necks of any individual condensation unit need not be axially aligned. For example, the necks of each unit may be set back further from the periphery of the unit than the legs. As long as the units are built identically, stackability of the units into an array may still be achieved by flipping every second unit on its head to join legs-to-legs or necks-to-necks of adjacent units. The resultant vertical fluid passages would be an off-set, or zig-zag, pattern rather than axially aligned through the array. However, this variant is not preferred as it may adversely affect the structural stability of an array.

We claim:

1. An assembly for urging condensation of a vapour comprising an array of spaced condensation units exposed to a heat transfer medium thereabout, each condensation unit having a chamber formed by a shell having at least one first fluid passageway for receiving the vapour, the chamber defining a second fluid passageway which communicates with each first fluid passageway and serves to urge condensation of the vapour into a liquid and to urge the liquid to travel toward a fluid storage means, wherein the array provides means for the vapour to travel between the chambers of the condensation units along the first fluid passageway, and the condensed liquid is urged from the chambers toward the fluid storage means along the first fluid passageway.

2. The assembly of claim 1 wherein the condensation units are vertically stacked in a spaced relationship to form the array.

3. The assembly of claim 2 wherein an inlet for introducing the vapour into the array is located in one of the top-most condensation unit of the array and the lower-most condensation unit of the array.

4. The assembly of claim 1 wherein a space between opposed condensation units is enclosed and adapted to receive a heat transfer fluid.

5. The assembly of claim 4 wherein the heat transfer fluid is selected from a group consisting of a refrigerant, a heated fluid and the ambient.

6. The assembly of claim 1 wherein the chamber includes a means for passing a heat transfer fluid therethrough.

7. The assembly of claim 1 further comprising an inlet header for introducing vapour into each condensation unit of the array.

8. The assembly of claim 1 wherein the fluid storage means comprises a storage tank, and the array is mounted on the tank.

9. The assembly of claim 1 wherein the heat transfer medium is selected from a group consisting of the ambient, a refrigerant and a heated fluid.

10. An assembly for urging condensation of a vapour comprising an array of spaced condensation units exposed to a heat transfer medium thereabout, each condensation unit having a chamber formed by a shell having at least one first fluid passageway for receiving the vapour, the chamber defining a second fluid passageway which communicates with each first fluid passageway and serves to urge condensation of the vapour into a liquid and to urge the liquid to travel toward a fluid storage means;

at least one elongate hollow leg member accessing the chamber through the shell for fluid communication therewith;

at least one elongate hollow neck member accessing the chamber through the shell for fluid communication therewith, each first fluid passageway encompassing a respective pair of neck and leg members;

wherein the vapour introduced into the array may travel along the first fluid passageway to the second fluid passageway, and the condensed liquid is urged from the chambers toward the fluid storage means along the first fluid passageway.

11. The assembly of claim 10 wherein the first fluid passageway is generally transverse to the second fluid passageway.

12. The assembly of claim 10 wherein the first fluid passageway is oriented generally vertically and the second fluid passageway is oriented generally horizontally.

13. The assembly of claim 10 wherein the respective pairs of leg and neck members are aligned to form a generally linear first fluid passageway therebetween.

14. The assembly of claim 10 wherein the leg and neck members extend away from the shell and are exposed to the heat transfer medium to further promote vapour condensation and to provide means for coupling the condensation units to form the array.

15. The assembly of claim 10 wherein a space is created between opposed condensation units by coupling complimentary neck and leg members of the opposed condensation units.

16. The assembly of claim 10 comprising an inlet at one of the condensation units aligned with the first fluid passageway for introducing the vapour into the array.

17. The assembly of claim 16 wherein the inlet comprises the neck member.

18. The assembly of claim 10 comprising an inlet at one of the condensation units aligned with the second fluid passageway for introducing the vapour into the array.

19. The assembly of claim 18 wherein the inlet extends past the first fluid passageway into the chamber.

20. The assembly of claim 10 wherein the first fluid passageway includes means to avoid mixing any vapour and liquid traveling therealong.

21. The assembly of claim 20 wherein the means to avoid mixing comprises a funnel member adapted to channel vapour through the funnel member and away from liquid passing outside the funnel member.

22. The assembly of claim 10 wherein at least one of the leg members of the lowermost condensation unit in the array is operatively engaged with a respective inlet to the fluid storage means.

23. An apparatus for urging condensation of a vapour comprising:
   a shell forming a chamber and having an outer surface exposed to a heat transfer medium;
   at least one hollow leg member accessing the chamber for fluid communication therewith;
   at least one hollow neck member accessing the chamber for fluid communication therewith, the neck and leg members being paired to define a first fluid passageway therebetween which traverses the chamber;
   a second fluid passageway defined by the chamber and extending from the first fluid passageway to promote condensation of the vapour into a liquid;
   wherein liquid condensed in the second fluid passageway is transmitted toward a fluid storage means along the first fluid passageway.

24. The apparatus of claim 23 wherein the first fluid passageway is generally transverse to the second fluid passageway.

25. The apparatus of claim 23 wherein the first fluid passageway is oriented generally vertically and the second fluid passageway is oriented generally horizontally.

26. The apparatus of claim 23 wherein the paired leg and neck members are aligned to form a generally linear first fluid passageway therebetween.

27. The apparatus of claim 23 wherein the leg and neck members extend away from the shell and are exposed to the heat transfer medium to further promote vapour condensation and to provide means for coupling multiple shells to form an array.

28. The apparatus of claim 23 wherein the chamber includes a means for passing a heat transfer fluid therethrough.

29. The apparatus of claim 23 wherein the first fluid passageway includes means to avoid mixing any vapour and liquid traveling therealong.

30. The apparatus of claim 29 wherein the means to avoid mixing comprises a funnel member adapted to channel vapour through the funnel member and away from liquid passing outside the funnel member.

31. The apparatus of claim 23 wherein the shell includes an inlet extending past the first fluid passageway into the chamber for delivering the vapour thereinto.

32. The apparatus of claim 23 wherein the heat transfer medium is selected from a group consisting of the ambient, a refrigerant and a heated fluid.

* * * * *